SEWING UNIT

Filed Oct. 22, 1946 9 Sheets-Sheet 1

INVENTORS.
NORMAN. V. CHRISTENSEN
GEORGE. SAUER
BY
ATTORNEY

SEWING UNIT

Filed Oct. 22, 1946 9 Sheets-Sheet 2

INVENTORS.
NORMAN.V.CHRISTENSEN
GEORGE. SAUER
BY
H. C. [signature]
ATTORNEY

June 13, 1950 N. V. CHRISTENSEN ET AL 2,511,047

SEWING UNIT

Filed Oct. 22, 1946 9 Sheets-Sheet 3

INVENTORS.
NORMAN. V. CHRISTENSEN
GEORGE. SAUER

BY H. C. [signature]

ATTORNEY

June 13, 1950 N. V. CHRISTENSEN ET AL 2,511,047

SEWING UNIT

Filed Oct. 22, 1946 9 Sheets-Sheet 4

INVENTORS.
NORMAN. V. CHRISTENSEN
GEORGE SAUER

BY H. C. [signature]

ATTORNEY

INVENTORS.
NORMAN.V.CHRISTENSEN
GEORGE.SAUER
BY
H. C. Hiesenup
ATTORNEY

SEWING UNIT

Filed Oct. 22, 1946 9 Sheets-Sheet 6

INVENTORS.
NORMAN. V. CHRISTENSEN
GEORGE. SAUER
BY
H. C. Liesemer
ATTORNEY

June 13, 1950 N. V. CHRISTENSEN ET AL 2,511,047

SEWING UNIT

Filed Oct. 22, 1946 9 Sheets-Sheet 7

INVENTORS.
NORMAN. V. CHRISTENSEN
GEORGE. SAUER
BY
H. C. [signature]
ATTORNEY

June 13, 1950 N. V. CHRISTENSEN ET AL 2,511,047

SEWING UNIT

Filed Oct. 22, 1946 9 Sheets-Sheet 8

INVENTORS.
NORMAN. V. CHRISTENSEN
GEORGE. SAUER
BY
H. C. [signature]
ATTORNEY

SEWING UNIT

Filed Oct. 22, 1946 9 Sheets-Sheet 9

INVENTORS.
NORMAN. V. CHRISTENSEN
GEORGE. SAUER
BY
H. C. [signature]
ATTORNEY

Patented June 13, 1950 2,511,047

UNITED STATES PATENT OFFICE 2,511,047

SEWING UNIT

Norman V. Christensen, Chicago, and George Sauer, Berwyn, Ill., assignors to Union Special Machine Company, Chicago, Ill., a corporation of Illinois Application October 22, 1946, Serial No. 704,822

12 Claims. (Cl. 112—258)

This invention relates to an improved sewing unit comprising a sewing machine, an electric transmitter or power unit for driving the same, and a supporting structure therefor in the form of a pedestal which includes a tubular vertical support and a base structure carrying suitable foot treadle controls.

An object of the invention has been to provide a simple, compact sewing unit of the character indicated which is of sturdy construction, relatively free from vibration and readily shiftable from one position to another in a line.

It has been a further object of the invention to provide a sewing unit of the type indicated which may be readily assembled, disassembled, inspected, and repaired.

A further object of the invention has been to provide a unit of the foregoing character which has a conveniently disposed work supporting and guiding member so associated with the sewing machine as to facilitate the handling of the work preparatory to feeding it to and as it is fed from the sewing machine and to prevent the entanglement of the work with the clothing or legs of the operator.

In the attainment of the foregoing objects, a feature of the invention resides in the provision of a supporting member adapted to be adjustably mounted at the upper end of a column or pedestal and which, in turn, carries in a convenient manner a sewing machine and an electric transmitter for driving the sewing machine, together with various accessory devices. The supporting member is so constructed that the transmitter or power unit, including an electric motor and a clutch, may be readily mounted upon its upper surface and may be suitably adjusted on said surface to maintain the proper relationship thereof to the sewing machine and to maintain a proper tension on the driving belt which connects the transmitter with the sewing machine. The improved arrangement is such that the assembly and adjustment of the transmitter on the pedestal support may be readily accomplished by a single workman.

Another important feature of the invention is the provision of improved connections from foot treadle controls in the base of the pedestal to the various elements of the unit to be controlled by the foot treadles. These connections pass upwardly through the column or pedestal and are of such character as to be very readily and quickly connected and disconnected in the assembly and disassembly of the sewing unit. The connections, moreover, are such that one of the treadles is adapted to operate the clutch of the transmitter and also a lubricant pump associated with the sewing machine. The arrangement is such that the lubricant pump may be operated to a limited extent without operating the clutch to set the sewing machine into operation.

A further feature is the provision, in close association with the transmitter, of a small blower and independent low-power motor for supplying a stream of cooling air to the zone of operation of the needles for reducing the temperature of the latter and thus enabling higher speed operation of the machine. As will appear hereinafter, the invention is particularly adapted for a unit embodying a feed-off-the-arm type of sewing machine intended for use in the seaming of the tubular portions of heavy garments, such as overalls and the like. The provision of adequate and conveniently disposed needle cooling means is of particular importance in connection with a sewing unit of this character. In operating at speeds of around 5,000 stitches per minute on heavy, coarse materials, such as blue denim, there is a marked tendency for overheating of the needles, unless this is offset by adequate needle cooling provisions.

Still another feature of the invention is the provision of a long, curved or angled work supporting board which is pivotally and adjustably attached to the base of the pedestal and is adapted to be swung about its pivot either into an inactive position or into an active position over the lap of the operator and beneath the work supporting arm of the sewing machine. The upper smooth surface of this board facilitates the turning and handling of heavy fabrics, such as those used in forming overalls, in the manner required to produce the inside and outside seams of the tubular leg portions and the like. The work supporting board which is angled upwardly from the base, in front of the legs of the operator, to a point above her knees and is then bent inwardly over her lap, permits the work to be draped about the operator and advanced upwardly and inwardly from the region of her feet to the point where it may be folded around and fed along the work supporting arm of the sewing machine, without entanglement with the feet, legs, and clothing of the operator.

Other objects, features, and advantages of the invention will appear from a detailed description of an illustrative embodiment of the same which will now be given in conjunction with the accompanying drawings, in which.

Figures 1, 2:
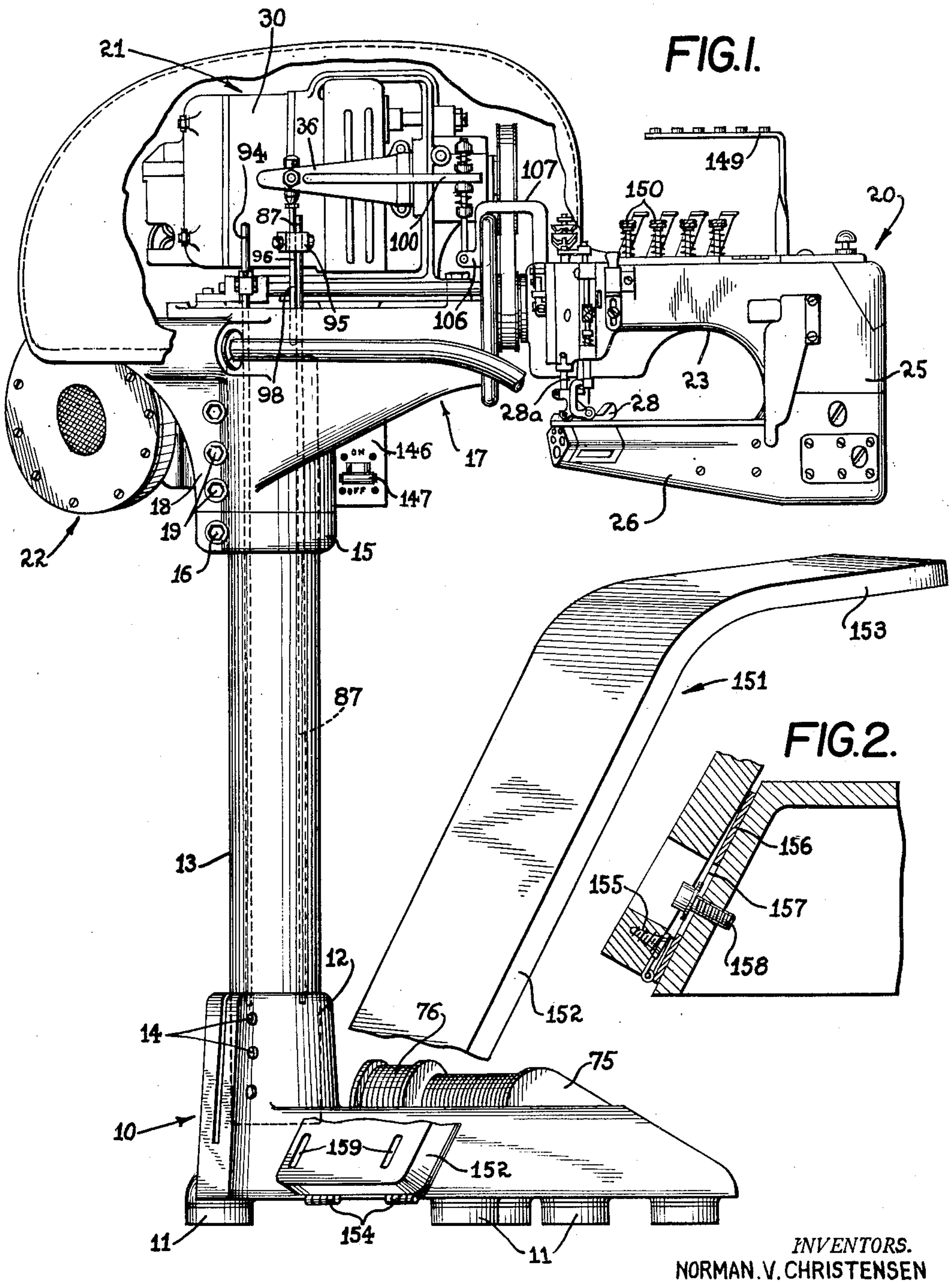
Fig. 1 is an elevational view of the improved sewing unit as seen from the side of the sewing machine and transmitter, certain portions of the construction being broken away to disclose more readily certain of the concealed parts.
Fig. 2 is a detail view, in section, showing the manner of mounting the work supporting board on the pedestal base.

Referring now to the drawings, the sewing unit comprises a supporting structure consisting of a base indicated generally at 10 in Fig. 1 adapted to stand on the floor of the factory or mill in which the unit is installed. This base has a plurality of short downwardly extending feet 11 adapted to engage the floor over a wide area. In view of the weight of the complete unit and the area over which the base is arranged to engage the floor, the unit is held relatively firmly without the necessity of actually fastening it to the floor by screws or the like. A readily shiftable unit is thus created.

Rising upwardly from the base 10 at one side thereof is a split collar-like boss 12 adapted to receive the lower end of a post or column 13. Screws or bolts 14 serve to clamp the split portions of the boss to retain the column in a desired position. Adjacent the upper end of the column 13 there is secured thereto a split collar 15 adapted to be clamped by a screw or bolt 16 at any desired elevation. Above the collar 15 there is mounted on the column a horizontally disposed support or bracket member, designated generally at 17 in Fig. 1. This has integrally associated with it a split collar 18 adapting it to be secured in any desired angular position on the column by means of screws or bolts 19. It will be apparent that, through appropriate adjustment of the collars 15 and 18, the horizontal support member 17 may be secured to the column at any desired elevation and in any desired angular relation to the base 10. As will be explained more fully hereinafter, the member 17 is adapted to support a sewing machine designated generally at 20 (Fig. 1), an electric transmitter designated generally at 21, and a blower designated generally at 22.

The sewing machine 20 may be of a variety of suitable constructions but is preferably of the feed-off-the-arm type shown. Basically the machine illustrated is of the type disclosed in the Christensen, et al. Patent No. 1,741,095, granted December 24, 1929, and in modified form in Christensen Patent No. 2,374,731, granted May 1, 1945, and in the Sauer application, Serial No. 602,198, filed June 29, 1945 and now matured into Patent No. 2,474,331, dated June 28, 1949. For details of the construction of the machine, reference may be had to said patents and application.

Figure 3:
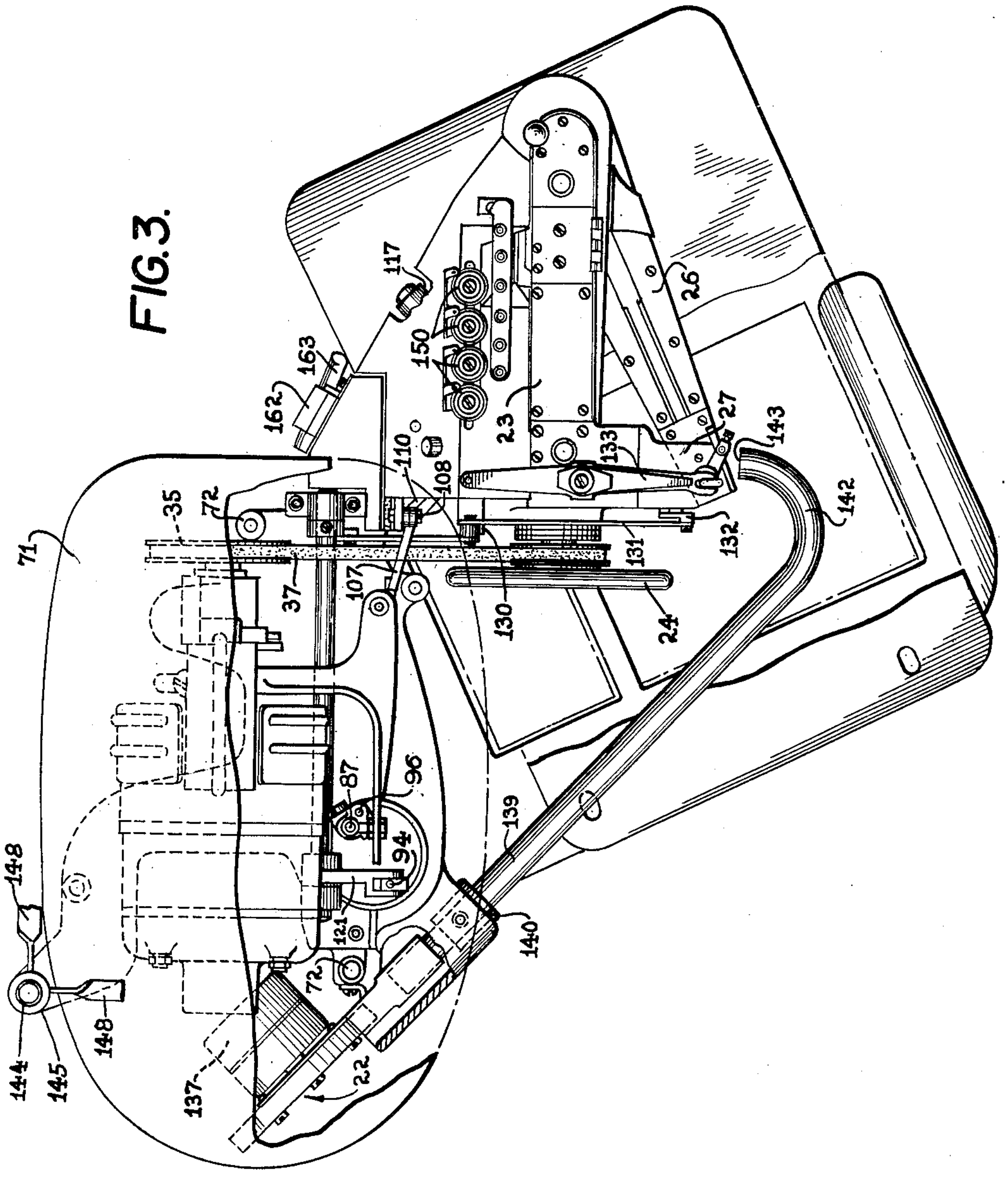
Fig. 3 is a top plan view of the improved sewing unit, portions of the construction being broken away for purposes of better illustration of hidden parts.
Figure 4:
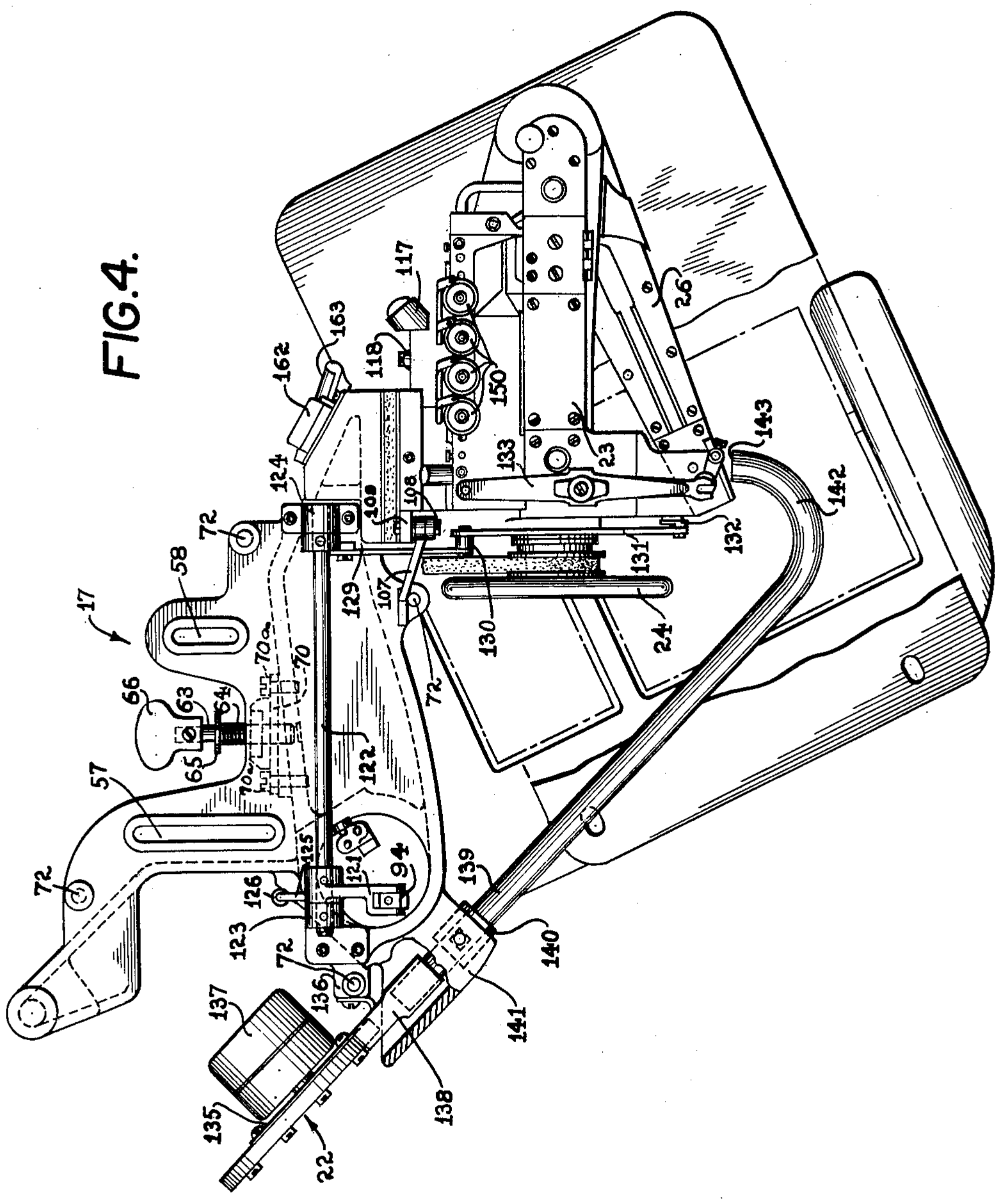
Fig. 4 is a view similar to Fig. 2, but with the electric transmitter and its cover removed to show more clearly the supporting and adjusting means therefor.

In general, it comprises a frame having a main upper portion 23 in which is journalled the main shaft of the machine carrying at its outer end, toward the left in Figs. 1, 3, and 4, a combined handwheel and pulley 24. A downwardly extending portion 25 of the frame carries at its lower end a laterally extending work supporting arm 26 which is angled outwardly, as best shown in Figs. 3 and 4, in relation to the main body portion 23 of the frame. It will be understood that the machine embodies the usual stitch-forming devices, including a needle mounted upon the lower end of a vertically disposed needle bar arranged to be reciprocated within a needle head. Suitable complemental stitch-forming devices, in the form of loopers or the like, are provided within the work supporting arm 26, these being arranged to be driven by appropriate connections from the main shaft to which the pulley 24 is connected. Also within the work supporting arm 26, appropriate work feeding means, such as a four-motion feed dog (not shown), is provided, this being arranged to cooperate with the work to feed the same outwardly along the upper surface of the arm 26 in conjunction with the presser foot 28 which is carried at the lower end of a presser bar 28*a*.

Figure 5:
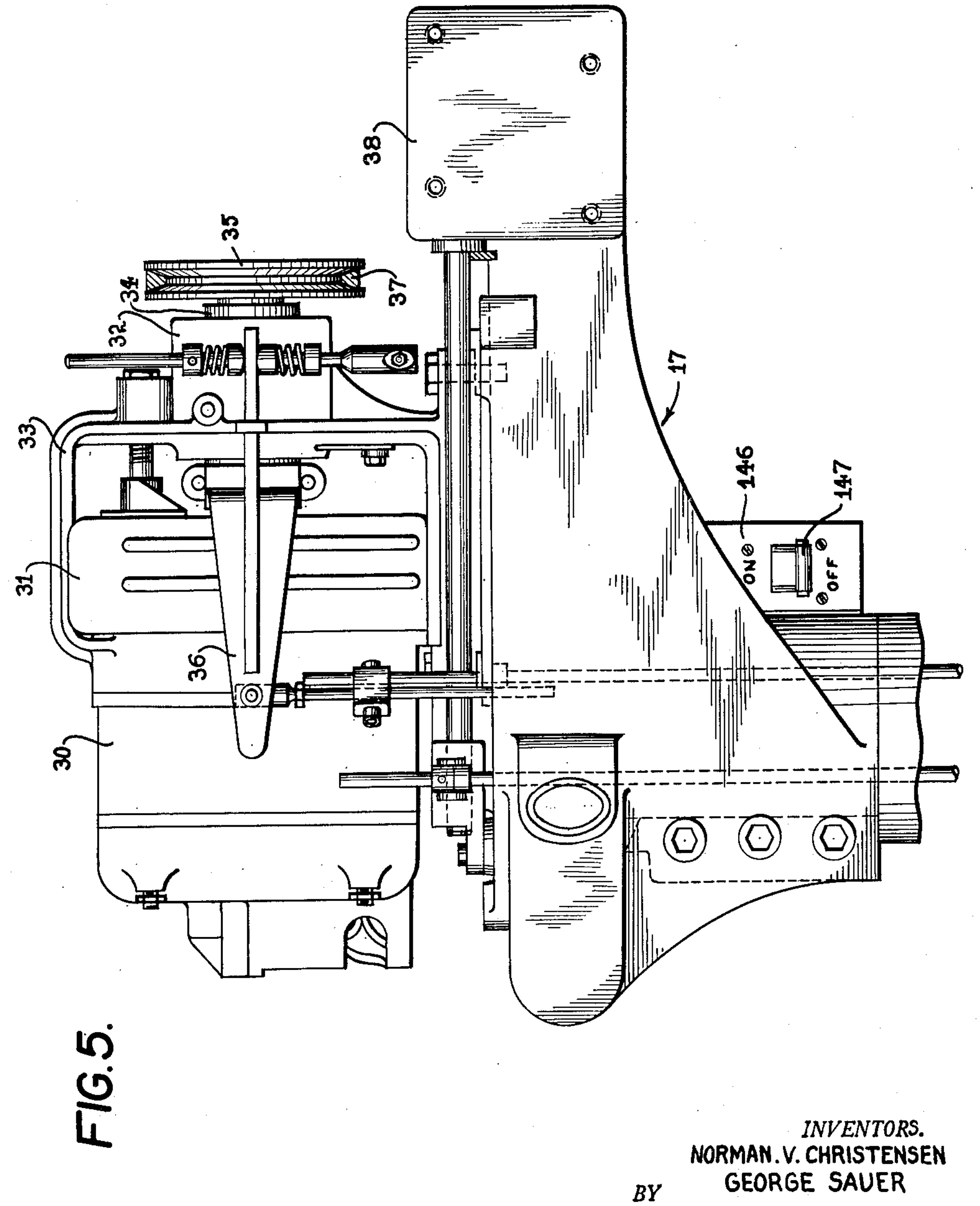
Fig. 5 is an elevational view, taken from one side, of the support member carried at the upper end of the pedestal and shows the transmitter mounted thereon.

The electric transmitter 21 may suitably be of the type disclosed in the patent to Peets, et al. No. 2,004,055, granted June 4, 1935. In general, it includes a motor 30 and a clutch, not shown but housed within a member 31 secured to the right end of the motor housing (Fig. 5). Within a bearing portion 32, carried by a frame 33 connected with the motor housing, there is slidably mounted a sleeve 34 which as disclosed in said Peets, et al. patent carries the driven shaft of the clutch unit to which is secured a pulley 35. A clutch operating arm 36 is clamped to the sleeve 34 and, as disclosed in said Peets, et al. patent, the arrangement is such that rocking of the arm 36 and the sleeve 34 about the axis of the sleeve, through an appropriate angle, will cause the sleeve to shift endwise for engagement of the clutch. When the clutch is so engaged, the pulley 35 will be rotated and power will be transmitted by a belt 37 to the pulley 24 of the sewing machine, so that the latter will be driven.

In order to eliminate vibration as far as possible the sewing machine is connected with the bracket member 17 through a vibration isolating or insulating member. For this purpose a flat surface 38 is provided on the bracket member 17 adjacent one end, this surface being vertically disposed. A corresponding flat, vertically disposed surface 39 is provided on the frame of the sewing machine. This is provided on a detachable bracket member 40 (Fig. 7) which is secured to the main body 23 of the frame by means of a plurality of screws 41. Between the two flat surfaces 38 and 39 there is provided a flexible connecting member comprising a pair of outer plates 42 and 43 and an interposed cushion 44 formed of a relatively soft yielding material such as natural or synthetic rubber. The plates 42, 43 are permanently adhesively bonded to the intermediate cushion member. A plurality of screws 45 serve to secure the plate 42 to the bracket member 40, these screws being accessible for application and removal through openings 46 in the plate 43 and the cushioning member. Similar screws 47 serve to connect the plate 43 to the vertically disposed surface 38, these screws being accessible through openings 48 in the plate 42 and in the cushioning member. The screws 47 are also rendered accessible through appropriate openings in the frame structure. In the assembly of the parts the insulating member is first attached to the bracket 40, which is either previously or subsequently connected with the sewing machine frame, and then the insulating member is attached by the screw 47 to the vertical surface 38 of the supporting member.

Figure 12:
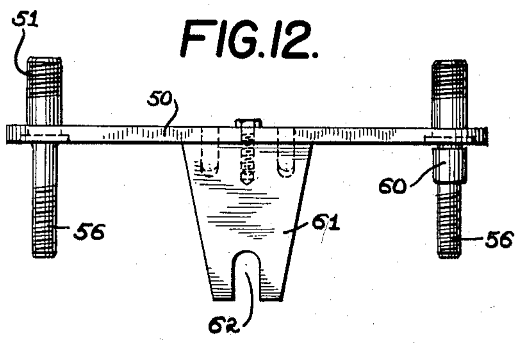
Fig. 12 is a side view of said supporting plate.
Figure 13:
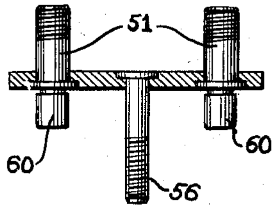
Fig. 13 is a transverse section through said plate, taken on the line 13—13 of Fig. 11.
Figure 11:
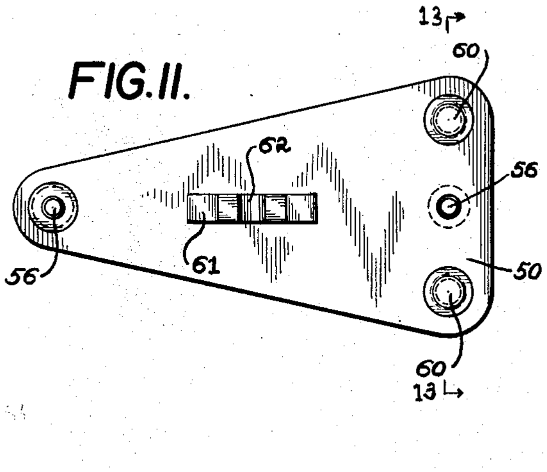
Fig. 11 is a detail view in plan showing a special supporting plate for the transmitter.

The power unit or electric transmitter is mounted upon the upper surface of the bracket member 17. The arrangement is such that the unit may simply be placed on top of the bracket member and then secured by the means now to be described. A plate 50 of triangular configuration, as best shown in Figs. 11 to 13, inclusive, is secured to the bottom of the power unit by means of upwardly extending screw-threaded stems 51. These are passed through suitable openings in the plate 50 and extend through openings provided in feet 52 integral with the frame of the power unit. A nut 53 provided on each of the threaded stems above the associated foot 52 serves to clamp the plate to the frame of the power unit. To eliminate vibration to a substantial extent, vibration insulators 54 are provided between the feet 52 and the upper surface of the plate 50 and similar insulators 55 are provided between the nuts 53 and the upper surfaces of the feet. These insulators may be formed of natural or synthetic rubber, or other yieldable vibration absorbing materials.

Extending downwardly from the plate 50 is a pair of threaded stems 56 adapted to cooperate with elongated openings 57 and 58 extending through the bracket member, these openings being elongated in a direction transverse to the axis of the power unit. The stem 56 at the smaller end of the plate may be formed integrally with the stem 51 at this point, an intermediate flange on the double stem member being arranged to fit into a recess in the under surface of the plate. The other stem 56 may simply have a head at its upper end arranged to fit into a recess in the upper side of the plate. Beneath the bracket member the stems 56 are engaged by threaded sleeves 59 having enlarged heads at their lower ends. These heads enable the sleeves to be turned readily by hand to clamp the plate 50 firmly in adjusted position against the upper surface of the bracket member. The stems 51 at the broader end of the plate, may be provided with smooth downwardly extending heads 60 adapted to cooperate with the elongated slot 57 to maintain the plate in proper alinement. Intermediate these heads 60 and their associated threaded stems 51 flanges may be provided which seat in recesses in the under surface of the plate.

Figure 6:
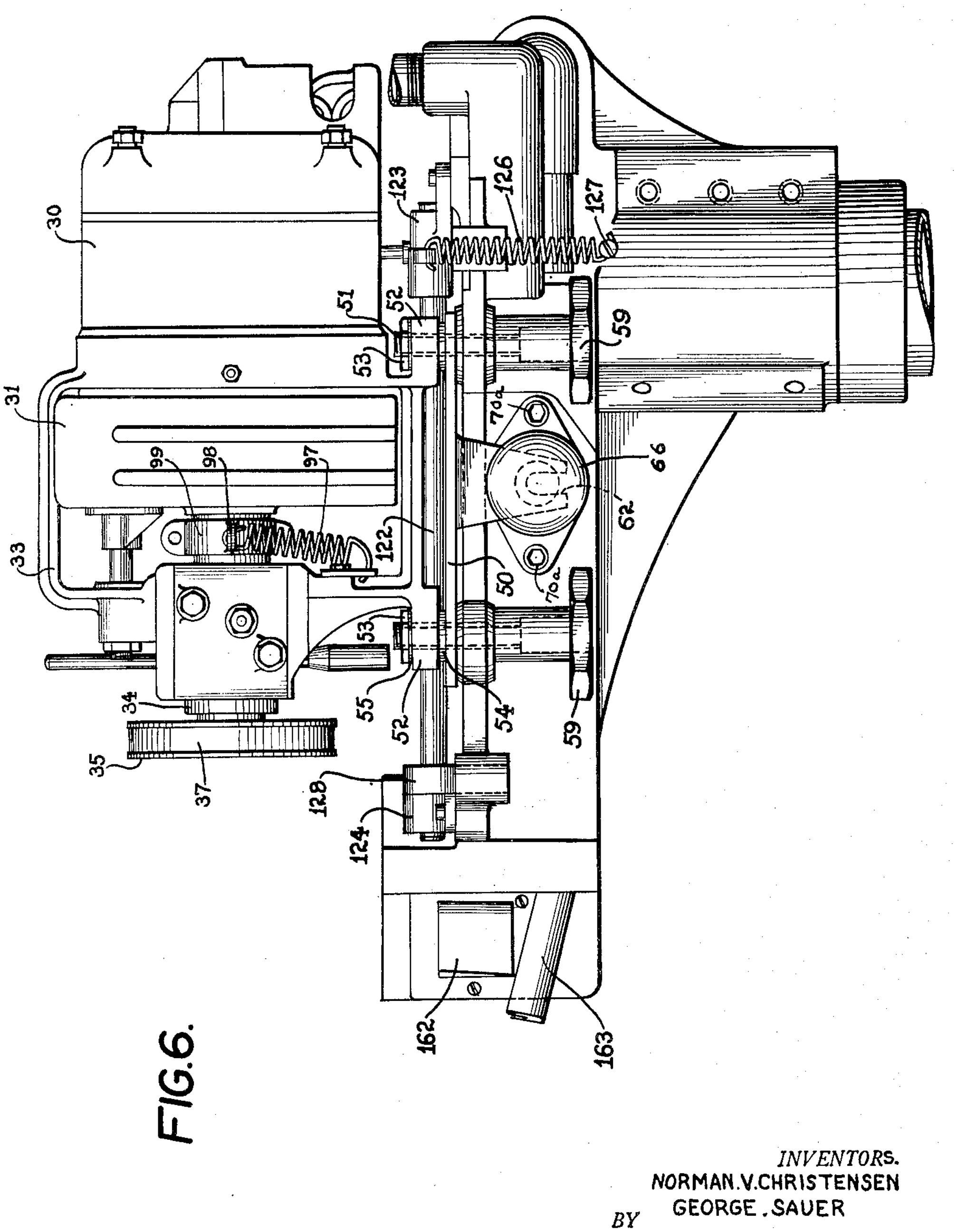
Fig. 6 is a view of the parts shown in Fig. 5 but is taken from the opposite side.

To enable micrometer adjustment of the plate in relation to the bracket member, the plate is provided adjacent its center with a downwardly extending leg 61 having an open notch 62 in its lower edge. This notch is arranged to be engaged over a reduced shank 63 of a screw-threaded member 64 (Fig. 8) which carries a collar or flange 65 between the threaded portion and the reduced shank. The leg 61 fits snugly between this collar and the inner end of a knob 66 secured to the shank 63. Threaded member 64 cooperates with threads in a disc 67 held by a firm adhesive bond in a member 68 formed of natural or synthetic rubber or other suitable vibration absorbing material capable of firmly retaining the disc. The latter is clamped against a vertical face on a downwardly extending web 69 of the bracket member 17 by means of a plate 70 which surrounds the member 68 and is adhesively united with it and in turn is secured to the bracket by means of screws 70*a* (Figs. 4 and 6). It will be seen from the foregoing that rotation of the screw element 64 by turning of the knob 66 will cause the leg 61 to be drawn toward or moved away from the disc 67, depending upon the direction of rotation of the screw element. This will cause a corresponding shifting of the plate 50. It will be understood, of course, that the plate 50 must first be set free for movement on the bracket member by loosening the threaded sleeves 59. Member 68 prevents the transmission of vibrations from the power unit to the bracket member 17. Adjustment of the plate 50 transversely to the axis of the power unit, in the manner explained, serves to either tighten or loosen the belt 37, as desired.

Figure 7:
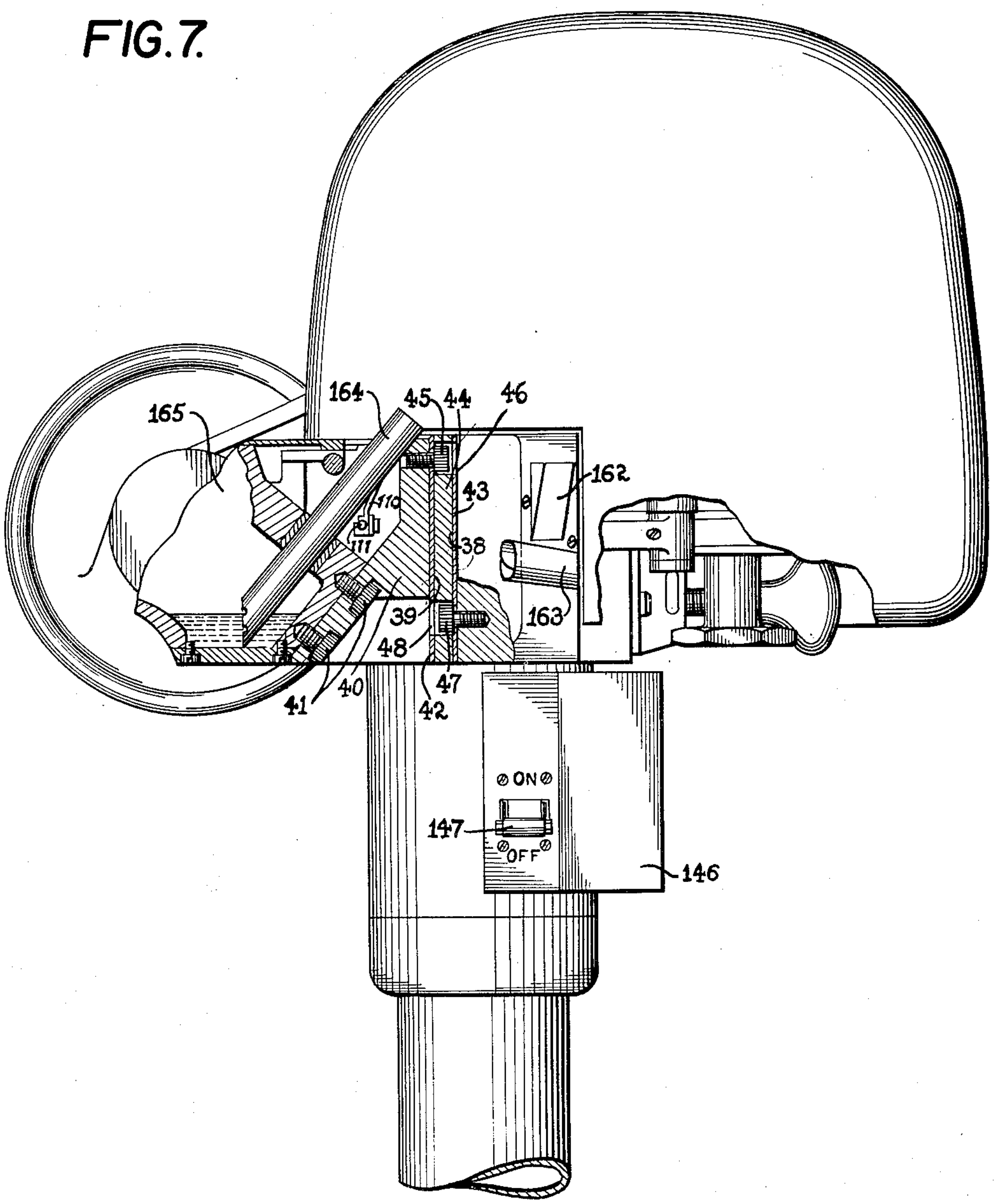
Fig. 7 is a view, largely in elevation but partly in vertical section, of the upper end of the pedestal, showing the supporting member mounted thereon, a part of the sewing machine, and a part of the transmitter unit with a cover therefor.

In the preferred construction a cover 71 is provided over the power unit to exclude dust and lint to a substantial extent from entering this unit. The cover may be secured in any suitable way to the bracket member and for this purpose there is provided, as shown in Fig. 4, a series of bosses 72 on the bracket member, each having an opening extending through the bracket member for the passage of the shank of a screw 73 (Fig. 8) arranged for threaded engagement with an inwardly extending lug 74 integral with the cover. As shown, the screws 73 may suitably be provided with large heads adapting them for turning by the fingers. While, it is preferred to provide a cover of the character indicated, this may, if desired, be omitted so as to render the power unit more readily accessible for adjustment and repair. Also, the cover may be of other forms and other means for securing it in place may be provided. The arrangement disclosed and described, however, allows for the adjustments of the power unit beneath the cover without disturbing the latter. The bottom of the cover, as shown, is open and provides access to the heads of the threaded sleeves 59 and the knob 66 for adjustment of the power unit. As shown in Fig. 1, the cover preferably extends over a substantial portion of the belt 37. The cover is cut away, as shown in Fig. 7, to fit over a portion of the frame of the sewing machine. The arrangement is such, however, that the hand wheel of the sewing machine is readily accessible for gripping and turning by the operator.

For the purpose of controlling the operation of the power unit and the lifting of the presser bar in the usual manner, a pair of treadles 75 and 76 is provided. These are rockably mounted on the base 10 of the supporting structure. Treadle 75 has a pair of downwardly extending lugs 77 adapted to receive and to be keyed to a shaft 78 journalled at its ends and at an intermediate point in bushings 79, 80, and 81 carried by the frame of the base member. To prevent axial shifting of the shaft 78 it has secured to it a collar 82 cooperating with the inner end of a boss 83 on the frame of the base member and it also has secured at its outer end the hub 84 of an arm 85. Hub 84 cooperates with a boss on the outer face of a portion of the base frame. Arm 85 is secured at 86, by a bolt or the like, to a rod 87 which extends upwardly through the column 13 to a point above the upper end of the latter. Treadle 76 is pivotally mounted in the base frame by means of a shaft 88 which is secured by a set screw 89 to the treadle and is journalled in bushings 90 and 91 carried by portions of the base frame. Movement of the treadle and the shaft 88 longitudinally of the latter is prevented by engagement of the treadle with the bushings. A rod 92 suitably secured to the forward end of the treadle is, at its opposite end, connected by means of a bolt 93 to a rod 94 which extends upwardly through the column 13 to a point above the top of the latter.

Turning now to the connections from the upper ends of the rods 87 and 94 to the devices controlled thereby, it will be seen in Fig. 1 that the rod 87 is secured by a clamp 95 to a downwardly extending rod 96 suspended from the outer end of the arm 36. The connection between the rod 96 and the arm 36 is preferably such as to permit relative swivelling. As will be seen, the connections are such that as the forward or upper end of the treadle 75 is depressed, the arm 85 will be rocked downwardly to draw the rod 87 and the rod 96 downwardly, thereby rocking the arm 36 downwardly about the axis of the power unit to bring about engagement of the clutch. Upon release of the treadle, the parts are restored to their original positions by means of a tension spring 97 (Fig. 6) secured at its lower end to a portion of the frame of the power unit and at its upper end to an arm 98 extending from a split or divided collar 99 by means of which the arm 36 is secured to the sleeve 34.

Figure 8:
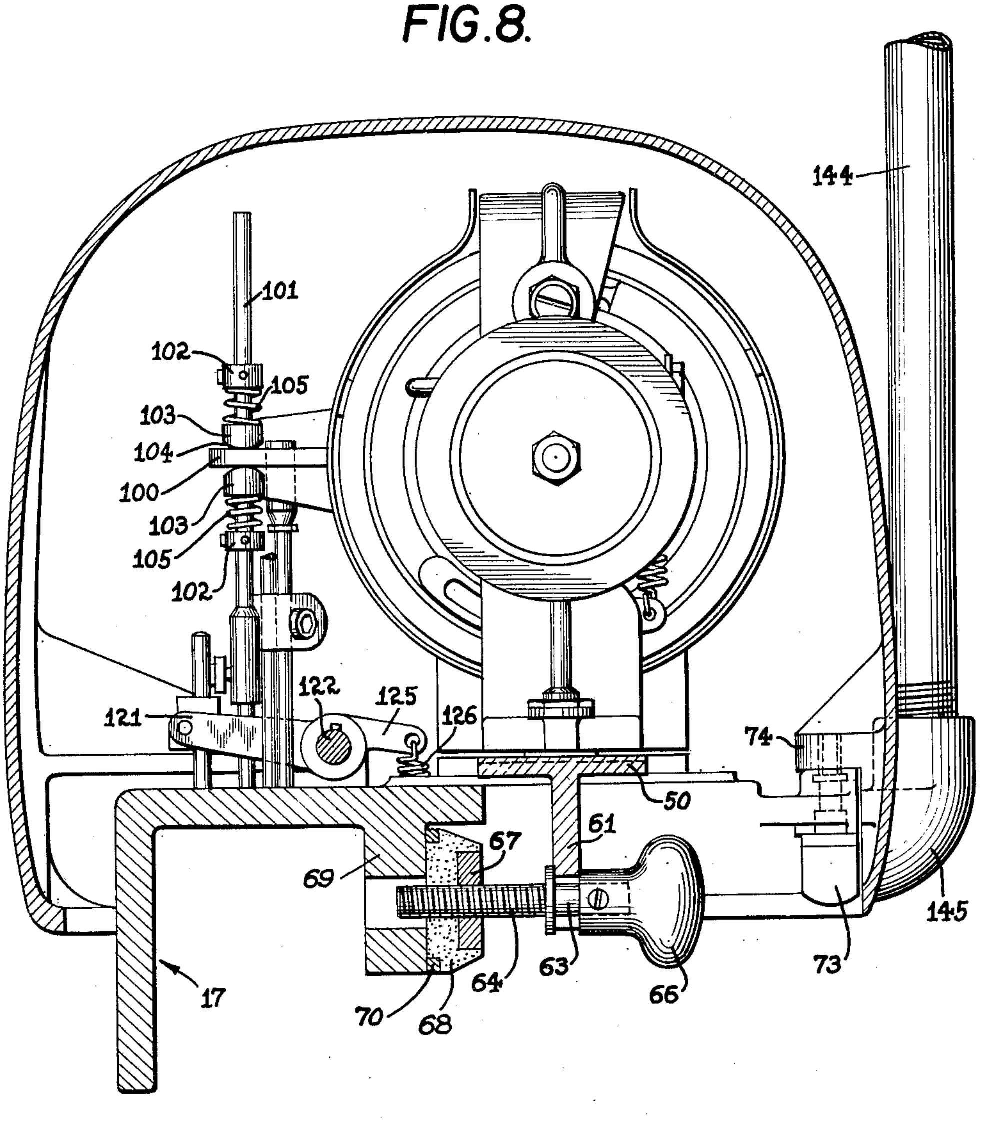
Fig. 8 is a vertical sectional view taken transversely through the transmitter cover member and shows the driving end of the transmitter and portions of the supporting structure and adjusting means for the transmitter and also various associated devices.
Figure 10:
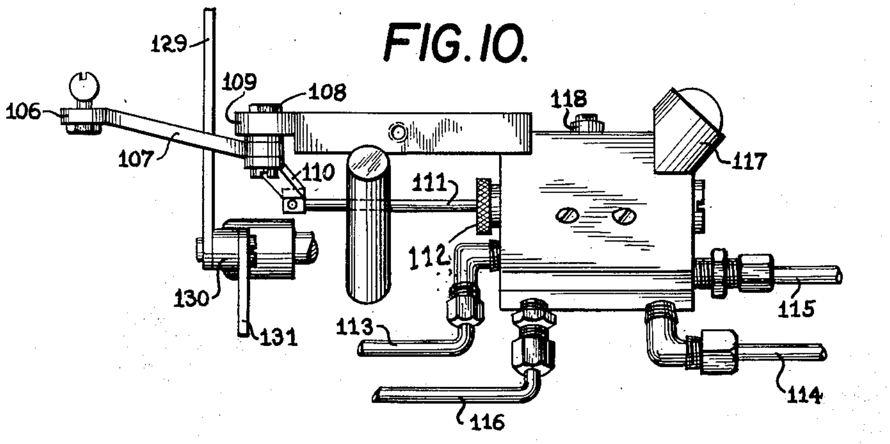
Fig. 10 is a detail view, partly in plan and partly in section, showing the lubricant pump and operating connections therefor and a portion of the associated sewing machine.

The arm 36 is also arranged to operate a lubricant pump of the type disclosed in the application of Clarence C. Smith, Serial No. 541,902, filed June 24, 1944, and now matured into Patent No. 2,430,370, dated Nov. 4, 1947. For this purpose the arm 36 is provided with a flat, bar-like extension 100 which, as best shown in Figs. 1 and 8, is apertured to receive a rod 101. The latter has secured thereto a pair of collars 102, one above and the other below the arm 100, and has slidably mounted thereon a pair of abutment members 103. The latter have surfaces 104 of spherical form adapted to engage the top and bottom surfaces of the arm 100. Springs 105 serve to urge the members 103 into engagement with the arm 100. Thus a yielding connection is provided between the arm 100 and the rod 101 which is held in a centralized position by the springs 105. At its lower end the rod 101 is pivotally secured to an ear 106 formed on a U-shaped lever 107 which extends over the top of the belt 37 and is pivotally connected by a stud 108 (Figs. 3, 4, and 10), to a portion 109 of the frame of the sewing machine. A downward extension 110 of the lever is pivotally connected at its lower end with a link 111 which is, in turn, connected with the piston rod of a double acting reciprocating pump 112 of the type more fully disclosed in the above mentioned Smith application.

The pump 112 is secured in any suitable manner to the main upper portion of the sewing machine frame. As will appear more clearly by reference to said Smith application, the arrangement is such that as the arm 36 is rocked downwardly, and the link 111 is shifted toward the right in Fig. 10, oil will be drawn into the left side of the pump cylinder through a line 113 connected with a sump in the needle head of the machine. At the same time oil will be discharged from the right side of the pump cylinder through a line 114 to a reservoir in the top of the machine frame. On movement of the link 111 and the connected piston in the opposite direction, oil will be drawn into the right side of the pump cylinder from the main sump in the work supporting arm through a line 115. At the same time oil will be forced from the left side of the pump cylinder through a line 116 to another reservoir for lubricating the parts in the needle head. The pump is provided with an overflow oil gauge 117 and a plug 118 adapted to permit drainage of oil which seeps past the piston.

The upper end of the rod 94, which extends upwardly through the column 13 in the manner explained, is pivotally connected with the forked end of an arm 121 which has a sleeve-like portion secured to a shaft 122 journalled in bearings 123 and 124 secured to the upper surface of the bracket member 17. A rearwardly extending arm 125 integral with the sleeve portion of the arm 121 has connected thereto the upper end of a spring 126, the lower end of which is connected at 127 to a portion of the bracket member. Spring 126 serves to restore the parts to the normal inactive positions indicated in the drawings whenever pressure is released from the treadle 76. It will be understood that when the treadle is depressed by the operator, the rod 94 will be drawn downwardly within the column and will rock the arm 121 downwardly and the shaft 122 in a counterclockwise direction in Fig. 8. Adjacent the bearing 124 there is secured to the shaft 122 a downwardly extending arm 128 at the lower end of which there is pivotally connected a link 129 (Figs. 3 and 4) which is, in turn, pivotally connected to a lever 130 mounted on the frame of the sewing machine. This lever corresponds functionally with the lever 53 of said Smith application. It is connected by a link 131 with an arm 132 carried by the needle head of the machine and which is arranged, through the connections illustrated in Fig. 6 of said pending Smith application, to lift the presser bar 28*a* against the action of the spring 133.

As previously indicated, the machine is preferably provided with means for cooling the needles. This comprises the blower 22 which may suitably be of the general construction illustrated in the Christensen, et al. application, Serial No. 670,762, filed May 18, 1946, and now matured into Patent No. 2,446,261, dated Aug. 3, 1948. The housing of the blower is carried by a bracket 135 to which it may be attached by screws or the like and which, in turn, is attached by screws to a portion 136 of the bracket member 17. Suitably supported by the blower housing or the bracket 135 is a motor 137, to the shaft of which is secured the rotor (not shown) of the blower. The discharge outlet of the blower housing is connected by a suitable flexible coupling 138 with the end of a tube 139. The latter is retained by a bushing 140 carried by an extension 141 of the bracket member 17. Tube 139 extends outwardly some distance and is provided with a goose neck 142, at its outer end, which serves to present the discharge outlet 143 relatively close to the path of movement of the needles above the work supporting arm.

Current for driving the motor 30 of the transmitter and also the small auxiliary motor 137 of the blower, which may suitably be of between 1/10 and 1/50 of a H. P., is conducted to the unit through a cable passed downwardly through a pipe 144 (Fig. 8) screw threaded into a socket 145 formed in an extension of the bracket member 17. From this point the cable, or one of the wires thereof, leads to a switch box 146 mounted on the side of the split collar portion of the bracket member 17. Operation of the switch 147 on the switch box serves to control the delivery of current to the two motors 30 and 137. The pipe 144 may also serve as the means for supporting thread cone carrying arms 148, only portions of which are shown in Fig. 3. These arms may suitably be of the C-shaped construction illustrated in the Sauer application, Serial No. 602,198. It will be understood that thread drawn from the cones carried by these C-shaped frames will be led to a guide member 149 secured to the top of the sewing machine and from there to a series of thread tensioning devices 150 also mounted on the top of the sewing machine. The course of the thread from these tensioning devices to the needles and loopers of the machine forms no specific part of the invention and, therefore, is not shown. It may be in accordance with the common practice.

For the purpose of facilitating the handling of the work and preventing interference and entanglement of the latter with the feet, legs, and clothing of the operator, a work supporting member 151 is provided. This is preferably formed of wood and provided with a polished upper surface and smooth, somewhat rounded edges, to avoid injury to the work and to facilitate movement of the work over its surface. The member 151 is preferably formed with two flat portions 152 and 153 connected by a sweepingly curved section, the arrangement being such that the portion 152, when the member is in active position, extends upwardly at an angle to the vertical substantially parallel with the legs of the operator below the knee. The upper portion 153 of the member is substantially horizontal, when in active position, and extends over the lap of the operator. It is spaced a suitable distance below the work supporting arm of the sewing machine, so as not to interfere with the free handling of the work but, at the same time, assists in carrying the weight of sections of the work which are removed some distance from the stitching point. At the lower end of the portion 152 the member is hingedly connected with the base 10. For this purpose hinges 154 are provided, these having one section secured by screws 155 to the under surface of the portion 152 and having their other section secured by screws or the like (not shown) to a plate 156 (Fig. 2), which is, in turn, adjustably mounted upon the base 10. The plate 156 is provided, for this purpose, with a pair of elongated slots 157 adapted to receive the shanks of screws 158 having threaded engagement with openings in the base. The heads of the screws 158 are accessible for loosening or tightening through elongated slots 159 extending through the portion 152 of the work supporting member. As will be seen, the arrangement is such that the height of the member 151 in relation to the base may be varied through a suitable distance so as to place the portion 153 at the most suitable elevation for a particular operator. As has been mentioned, a corresponding adjustment may be made in the elevation of the sewing machine itself by adjustment of the position of bracket member 17 on the column 13. The hinged mounting of the member 151 on the base enables the swinging of this member to a certain extent so as to carry the horizontally disposed portion 153 upwardly against the underside of the work supporting arm of the sewing machine. This permits the operator to seat herself more readily in position for operation of the machine.

Since the operation of the various parts of the machine has been explained in connection with the detailed description of the construction, a resumé of the operation is believed to be unnecessary. It should be observed, however, that the construction and arrangement of the several parts is such that the sewing machine is suspended or held substantially in free space in a position to be directly over the lap of the operator. Moreover, the relationship of the sewing machine, and particularly its work supporting arm, to the vertical column or post 13 is such that the work being stitched may be handled freely in sweeping movements of the hands of the operator to bring the desired portions into abutting relation for the formation of a seam. There is nothing to interfere with such movements, except the board member 151, and the latter assists rather than hinders the operator, as explained above. The construction thus has all of the advantages of the construction disclosed in said Sauer application, Serial No. 602,198. At the same time it has the additional advantages hereinabove noted with respect to the simplicity of the construction and the ease of assembling and adjusting the various parts, particularly the electric transmitter. Moreover, the work supporting member 151 relieves the strain upon the operator and facilitates the handling of cumbersome work such as sections of overalls and the like which may be operated upon by the sewing machine.

Figure 9:
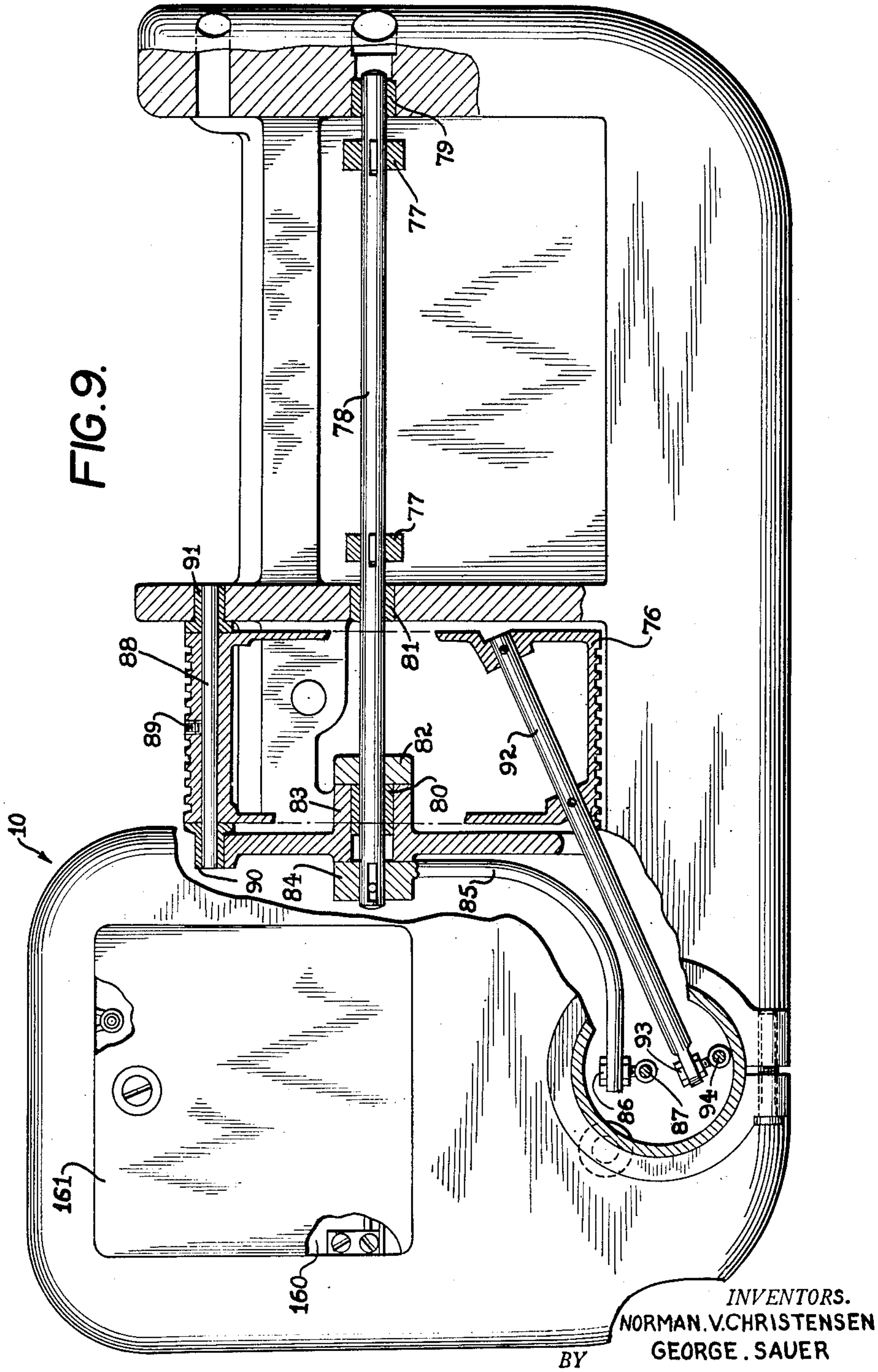
Fig. 9 is a view, partly in top plan and partly in horizontal section, showing the base portion of the supporting pedestal and the associated devices, parts of the structure being broken away for clearness of illustration of other parts.

The machine may be provided with any of the usual accessory devices. However, the construction of the improved unit lends itself to the incorporation of various advantageous special features. For example, as best shown in Fig. 9, the base 10 lends itself readily to the inclusion of a relatively large compartment 160 which is normally closed by a hinged cover 161. This compartment may be used to retain any personal belongings of the operator and any special devices or tools desired in the normal operation of the machine.

The forward end of the bracket member 17 may very conveniently be provided with a clip 162 (Figs. 4, 6, and 7) adapted to retain a ticket, or the like, which serves to identify the particular batch of work being handled by the operator at a certain time. Adjacent the ticket holder there may also be conveniently provided a tubular receptacle 163 adapted to retain a pair of scissors. The location of the member 163 is such that the scissors will be very conveniently disposed, when not in use, for quick use when occasion requires.

A further specific feature of the improved construction is the provision of an oil gauge 164, preferably formed of Lucite or similar material capable of transmitting light in a way to reveal the level of the lubricant within the enclosed chamber 165, adjacent the needle head, from which oil is withdrawn by the pump 112 through the intake 113 upon each operation of the treadle 75.

While a preferred embodiment of the invention has been disclosed in considerable detail, it will be understood that various changes may be made in the construction and arrangement of the several parts without departing from the general principles and scope of the invention.

What we claim is:

1. A sewing unit comprising a support having a floor engaging base and a column rising therefrom, a laterally extending rigid bracket mounted for vertical adjustment on said column adjacent the upper end thereof, said bracket having a horizontally disposed, plate-like supporting member, a sewing machine secured to the bracket adjacent one end thereof, said machine having horizontally disposed work supporting means below said member of said bracket, a power unit including a motor and clutch mounted on said supporting member, means for securing said power unit to the upper surface of said member of said bracket, said securing means being so constructed and arranged as to enable lateral adjustment of said power unit on said bracket, means connecting said power unit with said sewing machine for driving the latter, treadles mounted on said base, and connections from said treadles to said power unit and said sewing machine for controlling the operation thereof.

2. A sewing unit comprising a support having a floor engaging base and a column rising therefrom, a laterally extending rigid bracket mounted for vertical adjustment on said column adjacent the upper end thereof, said bracket having a horizontally disposed, plate-like supporting member, a sewing machine secured to the bracket adjacent one end thereof, said machine having horizontally disposed work supporting means below said member of said bracket, a power unit including a motor and clutch mounted on said supporting member, means for securing said power unit to the upper surface of said member of said bracket, said securing means including a plate-like member laterally adjustable on said bracket and arranged to carry said power unit in a predetermined fixed relation to said member, means connecting said power unit with said sewing machine for driving the latter, treadles mounted on said base, and connections from said treadles to said power unit and said sewing machine for controlling the operation thereof.

3. A sewing unit comprising a support having a floor engaging base and a column rising therefrom, a laterally extending rigid bracket mounted for vertical adjustment on said column adjacent the upper end thereof, said bracket having a horizontally disposed, plate-like supporting member, a sewing machine secured to the bracket adjacent one end thereof, said machine having horizontally disposed work supporting means below said member of said bracket, a power unit including a motor and clutch mounted on said supporting member, means for securing said power unit to the upper surface of said member of said bracket, said securing means including a member secured to said power unit and means for effecting micrometer adjustment of said member on said bracket, means connecting said power unit with said sewing machine for driving the latter, treadles mounted on said base, and connections from said treadles to said power unit and said sewing machine for controlling the operation thereof.

4. A sewing unit comprising a support having a floor engaging base and a column rising therefrom, a laterally extending rigid bracket mounted for vertical adjustment on said column adjacent the upper end thereof, said bracket having a horizontally disposed, plate-like supporting member, a sewing machine secured to the bracket adjacent one end thereof, said machine having horizontally disposed work supporting means below said member of said bracket, a power unit including a motor and clutch mounted on said supporting member, means for securing said power unit to the upper surface of said member of said bracket, said securing means including a plate-like member laterally adjustable on said bracket and arranged to carry said power unit in a predetermined fixed relation to said member, a cover for said power unit, means for securing said cover in fixed relation to said bracket, means accessible from beneath said cover for adjusting said member on said bracket without disturbing said cover, means connecting said power unit with said sewing machine for driving the latter, treadles mounted on said base, and connections from said treadles to said power unit and said sewing machine for controlling the operation thereof.

5. A sewing unit comprising a support including a floor engaging base and a column rising therefrom, a sewing machine carried by said column in a position above said base, said machine having work supporting and feeding means, a power unit carried by said column and connected with said sewing machine for driving the same, and a work supporting and guiding member adapted to support and guide the work as it is being stitched shiftably mounted on said support for movement to and from a predetermined active position below said work supporting means and between the same and said base.

6. A sewing unit comprising a support including a floor engaging base and a column rising therefrom, a sewing machine carried by said column in a position above said base, said machine having work supporting and feeding means, a power unit carried by said column and connected with said sewing machine for driving the same, and a work supporting and guiding member tiltably mounted on said base and having a table-like portion arranged to be positioned below said sewing machine between the same and said base for supporting and guiding the work as it is being stitched.

7. A sewing unit comprising a support including a floor engaging base and a column rising therefrom, a sewing machine carried by said column in a position above said base, said machine having work supporting and feeding means, a power unit carried by said column and connected with said sewing machine for driving the same, a work supporting and guiding member having a table-like portion arranged to be positioned below said sewing machine between the same and said base for supporting and guiding the work as it is being stitched, and means adjustable vertically on said base for supporting said member therefrom.

8. A sewing unit comprising a support including a floor engaging base and a column rising therefrom, a sewing machine carried by said column in a position above said base, said machine having work supporting and feeding means, a power unit carried by said column and connected with said sewing machine for driving the same, a work supporting and guiding member having a table-like portion arranged to be positioned below said sewing machine between the same and said base for supporting and guiding the work as it is being stitched, and means adjustable vertically on said base for supporting said member therefrom, said member being hingedly secured to said vertically adjustable means.

9. A sewing unit comprising a support including a floor engaging base and a column rising therefrom, a sewing machine carried by said column in a position above said base, said machine having work supporting and feeding means, a power unit carried by said column and connected with said sewing machine for driving the same, and work engaging and guiding means extending upwardly from said base adapted to support and guide the work as it is being stitched, said means having a portion extending upwardly substantially parallel with the legs of an operator seated before said sewing machine and a portion extending substantially horizontally over the lap of the operator and below said sewing machine.

10. A sewing unit comprising a support including a floor engaging base and a column rising therefrom, a sewing machine carried by said column in a position above said base, said machine having work supporting and feeding means, a power unit carried by said column and connected with said sewing machine for driving the same, and work engaging and guiding means extending upwardly from said base adapted to support and guide the work as it is being stitched, said means having a portion extending upwardly substantially parallel with the legs of an operator seated before said sewing machine and a portion extending substantially horizontally over the lap of the operator and below said sewing machine, said last mentioned portion being shiftable away from operative position to facilitate seating of the operator before said sewing machine.

11. A sewing unit comprising a support including a floor engaging base and a column rising therefrom, a horizontally disposed bracket adjustably secured to said column adjacent the upper end thereof, a sewing machine secured to the bracket at one end thereof, a power unit supported by the upper surface of said bracket and connected with said sewing machine for driving the same, a rigid member interposed between said power unit and said bracket, means for fixedly securing said member to said power unit, micrometer adjusting means carried by said bracket and connected with said member for adjusting the same, means for securing said member to said bracket in adjusted position, and yieldable vibration absorbing means interposed between said bracket and said power unit and said sewing machine and between said micrometer adjusting means and said member for eliminating the transmission of vibrations to said bracket.

12. A sewing unit comprising a support including a floor engaging base and a column rising therefrom, a horizontally disposed bracket adjustably secured to said column adjacent the upper end thereof, a sewing machine secured to the bracket at one end thereof, a power unit supported by the upper surface of said bracket and connected with said sewing machine for driving the same, a rigid member interposed between said power unit and said bracket, means for fixedly securing said member to said power unit, means for adjustably securing said member to said bracket, screw means connected with said member and said bracket for effecting micrometer adjustment of said member relative to said bracket, and yieldable vibration absorbing means interposed in all connections between said bracket and said power unit and said sewing machine and between said bracket and said member for eliminating the transmission of vibrations to said bracket.

NORMAN V. CHRISTENSEN.
GEORGE SAUER.

REFERENCES CITED

The following references are of record in the file of this patent:

UNITED STATES PATENTS

| Number | Name | Date |
|---|---|---|
| 262,500 | Sweeney | Aug. 8, 1882 |
| 269,215 | Lasscell et al. | Dec. 19, 1882 |
| 680,660 | Hug | Aug. 13, 1901 |
| 1,232,152 | Wood | July 3, 1917 |
| 1,351,244 | Gutstein | Aug. 31, 1920 |
| 2,059,013 | Morrill | Oct. 27, 1936 |
| 2,063,841 | Goosman | Dec. 8, 1936 |
| 2,183,366 | Chason et al. | Dec. 12, 1939 |
| 2,347,782 | Knott | May 2, 1944 |
| 2,374,731 | Christensen | May 1, 1945 |
| 2,418,429 | Sauer | Apr. 1, 1947 |